(12) United States Patent
Lounsberry et al.

(10) Patent No.: US 7,654,544 B2
(45) Date of Patent: Feb. 2, 2010

(54) AIR DEFLECTOR ARRANGEMENT FOR A VEHICLE

(75) Inventors: Todd H Lounsberry, Livonia, MI (US); Mark C Todd, Rochester Hills, MI (US); Mark Hinspeter, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 433 days.

(21) Appl. No.: 11/265,329

(22) Filed: Nov. 2, 2005

(65) Prior Publication Data

US 2007/0096420 A1    May 3, 2007

(51) Int. Cl.
  *B60G 3/04*  (2006.01)
  *B62D 35/02*  (2006.01)
(52) U.S. Cl. .............................. 280/124.134; 296/180.1
(58) Field of Classification Search .......... 280/124.134, 280/124.153; 296/180.1; *B60G 3/04; B62D 35/02*
  See application file for complete search history.

(56) References Cited

U.S. PATENT DOCUMENTS

| | | | | |
|---|---|---|---|---|
| 1,277,550 A | * | 9/1918 | Connell | 138/106 |
| 2,200,177 A | * | 5/1940 | Klavik | 280/787 |
| 2,330,557 A | * | 9/1943 | Collis | 280/99 |
| 2,511,252 A | * | 6/1950 | Fernandez | 180/24.13 |
| 2,707,100 A | * | 4/1955 | Schilberg | 267/254 |
| 2,730,375 A | * | 1/1956 | Porsche et al. | 280/124.107 |
| 2,797,930 A | * | 7/1957 | Booth | 280/124.134 |
| 2,988,161 A | * | 6/1961 | Herr | 180/359 |
| 3,022,847 A | * | 2/1962 | Hansen et al. | 180/295 |
| 3,861,735 A | * | 1/1975 | Taylor | 296/180.1 |
| 4,119,339 A | * | 10/1978 | Heimburger | 296/180.5 |
| 4,262,953 A | * | 4/1981 | McErlane | 296/180.4 |
| 4,386,801 A | * | 6/1983 | Chapman et al. | 280/107 |
| 4,486,046 A | * | 12/1984 | Whitney et al. | 296/180.4 |
| 4,509,774 A | * | 4/1985 | Booher | 280/124.134 |
| 4,569,551 A | * | 2/1986 | Rauser et al. | 296/180.1 |
| 4,753,456 A | * | 6/1988 | Booher | 280/124.134 |
| 4,772,060 A | * | 9/1988 | Kretschmer | 296/180.1 |
| 4,779,894 A | * | 10/1988 | Cowburn | 280/124.134 |
| 4,810,021 A | * | 3/1989 | Burst | 296/180.1 |
| 5,024,481 A | * | 6/1991 | Swersky | 296/180.1 |
| 5,267,751 A | * | 12/1993 | Hiromoto et al. | 280/124.151 |
| 5,322,340 A | * | 6/1994 | Sato et al. | 296/180.1 |
| 5,362,090 A | * | 11/1994 | Takeuchi | 280/124.152 |
| 5,403,059 A | * | 4/1995 | Turner | 296/91 |

(Continued)

FOREIGN PATENT DOCUMENTS

DE    3239946 A1  *  5/1984

(Continued)

*Primary Examiner*—Paul N Dickson
*Assistant Examiner*—Laura Freedman
(74) *Attorney, Agent, or Firm*—Ralph E. Smith

(57) ABSTRACT

An air deflector for a vehicle underbody is provided. The air deflector includes a fairing having a general convex shape over a width of the fairing and extending a length of the fairing. The fairing is arranged to be affixed to an open end of a generally U-shaped vehicle underbody component to reduce aerodynamic drag experienced during operation of the vehicle. The fairing further includes a plurality of integrated clips positioned on opposite ends of the width of the fairing, the clips arranged to snap over flanged ends of the generally U-shaped vehicle underbody component.

16 Claims, 2 Drawing Sheets

U.S. PATENT DOCUMENTS

| | | | | |
|---|---|---|---|---|
| 5,513,893 A * | 5/1996 | Nakata et al. | ............. | 296/180.1 |
| 5,597,175 A * | 1/1997 | Tuan | .................... | 280/124.111 |
| 5,607,177 A * | 3/1997 | Kato | .................... | 280/124.134 |
| 5,695,213 A * | 12/1997 | Nakamura et al. | .... | 280/124.134 |
| 5,992,867 A * | 11/1999 | Kato et al. | ............. | 280/124.134 |
| 6,340,165 B1 * | 1/2002 | Kelderman | .......... | 280/124.153 |
| 6,685,202 B2 * | 2/2004 | Fujimoto | ............. | 280/124.109 |
| 6,705,627 B2 * | 3/2004 | Hasebe et al. | ......... | 280/124.134 |
| 6,761,295 B2 * | 7/2004 | Kubina et al. | ................ | 224/309 |
| 6,783,157 B2 * | 8/2004 | Huang et al. | ................ | 280/785 |
| 6,905,129 B2 * | 6/2005 | Runte et al. | ............ | 280/124.134 |
| 7,036,871 B2 * | 5/2006 | Adams | .................... | 296/180.1 |
| 2005/0104315 A1 * | 5/2005 | Howell et al. | ......... | 280/124.134 |

FOREIGN PATENT DOCUMENTS

| | | | |
|---|---|---|---|
| DE | 3607748 A1 | * | 9/1987 |
| DE | 3712048 A1 | * | 10/1988 |
| DE | 4319281 A1 | * | 12/1994 |
| DE | 19521632 A1 | * | 12/1996 |
| EP | 742135 A1 | * | 11/1996 |
| EP | 847912 A1 | * | 6/1998 |
| EP | 1013540 A2 | * | 6/2000 |
| EP | 1190937 A1 | * | 3/2002 |
| GB | 2017023 A | * | 9/1979 |
| JP | 06024361 A | * | 2/1994 |
| JP | 07215244 A | * | 8/1995 |
| JP | 11091642 A | * | 4/1999 |
| JP | 2001010543 A | * | 1/2001 |
| JP | 2004001617 A | * | 1/2004 |

* cited by examiner

AIR DEFLECTOR ARRANGEMENT FOR A VEHICLE

FIELD OF INVENTION

The present invention relates generally to an air deflector for a vehicle and, more particularly, to an air deflector for a motor vehicle underbody component.

BACKGROUND OF INVENTION

Generally, vehicle fuel efficiency continues to be an important design consideration for today's automotive manufacturers. Typically, several aspects of a vehicle contribute to its fuel economy performance including, but not limited to, aerodynamic performance of a vehicle exterior. A focus for improving aerodynamic performance of the vehicle exterior is often on the exterior body shape. A vehicle exterior body design typically balances aesthetics with aerodynamic performance in an effort to maximize fuel efficiency. One example of such balancing would be with a vehicle grill where aerodynamic performance as well as vehicle aesthetics and air flow performance for radiator cooling are balanced. However, as vehicle body exteriors are continually being refined to balance aesthetics with fuel efficiency, automotive manufacturers need to consider other aspects of a vehicle exterior for fuel efficiency improvements, such as a vehicle underbody.

Thus, there is a need for an air deflector arrangement for a vehicle underbody that overcomes the aforementioned and other disadvantages.

SUMMARY OF INVENTION

Accordingly, an air deflector for a vehicle underbody is provided. In accordance with one aspect of the present invention, the air deflector includes a fairing having a general convex shape over a width of the fairing and extending a length of the fairing. The fairing is arranged to be affixed to an open end of a generally U-shaped vehicle underbody component to reduce aerodynamic drag experienced during operation of the vehicle.

In accordance with another aspect of the present invention, the fairing further comprises a plurality of integrated clips positioned on opposite ends of the width of the fairing, the clips arranged to snap over flanged ends of the generally U-shaped vehicle underbody component.

In accordance with yet another aspect of the present invention, the air deflector is arranged to be affixed to a generally U-shaped rear suspension system lower control arm.

BRIEF DESCRIPTION OF DRAWINGS

Other aspects, features, and advantages of the present invention will become more fully apparent from the following detailed description of the preferred embodiment, the appended claims, and in the accompanying drawings in which:

DETAILED DESCRIPTION OF EXEMPLARY EMBODIMIENT(S)

Figure 1:
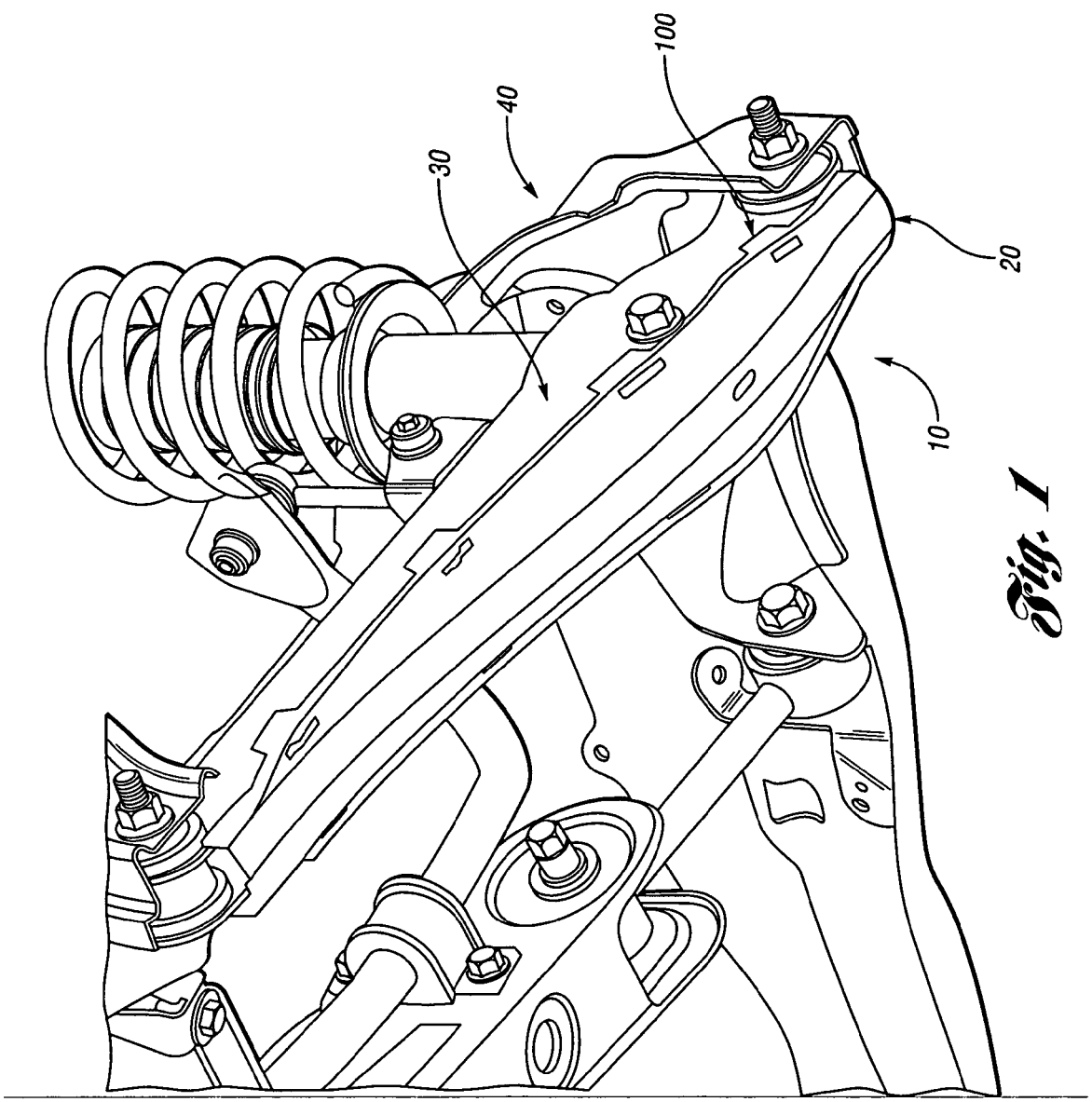
FIG. 1 illustrates a perspective view of an air deflector arrangement affixed to a vehicle underbody in accordance with the present invention.
Figure 2:
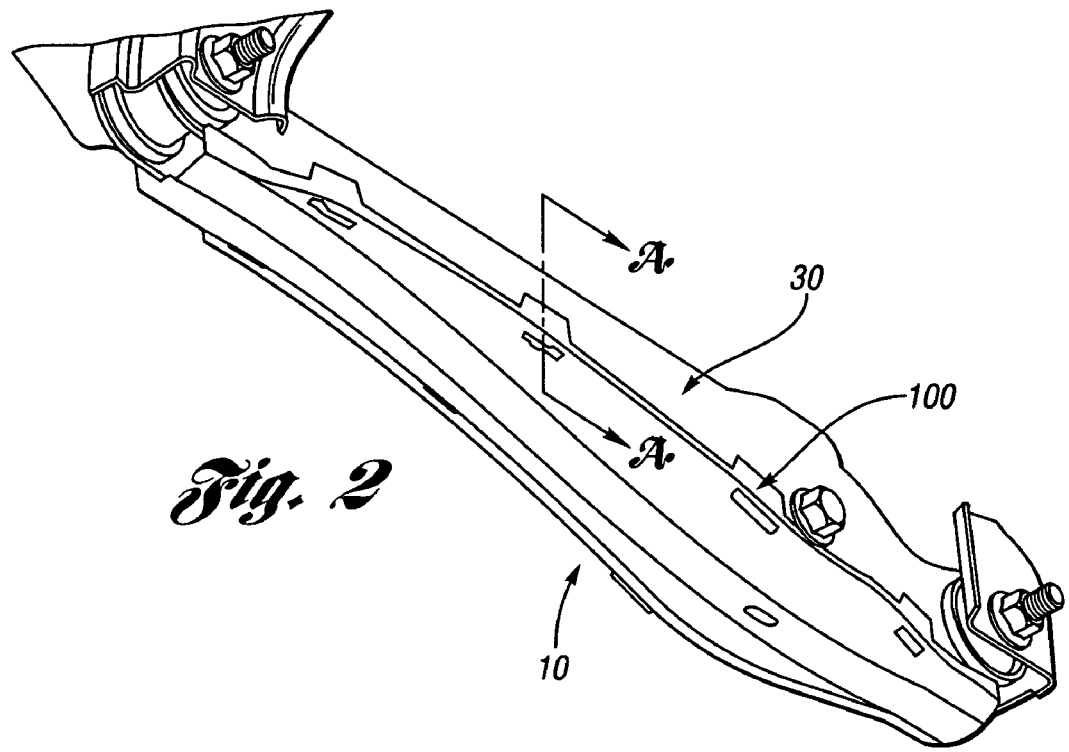
FIG. 2 illustrates a close-up view of the air deflector arrangement of FIG. 1 in accordance with the present invention.

In the following description, several well-known features of a vehicle underbody are not shown or described so as not to obscure the present invention. Referring now to the drawings, FIGS. 1-3 illustrate an exemplary embodiment of an air deflector arrangement 10 in accordance with the present invention.

The air deflector arrangement 10 includes a fairing 20 that is arranged to be affixed to a vehicle underbody component to reduce aerodynamic drag experienced during vehicle operation. Often a vehicle underbody contains components such as frame or suspension members that are formed in a U-shape with an open end of the U-shape facing downward or away from the vehicle underbody. These such components are generally in the air stream during vehicle operation and reduce aerodynamic efficiency.

In this exemplary embodiment, the fairing 20 is arranged to be affixed to a lower control arm 30 of a rear multilink suspend system 40 to reduce such aerodynamic drag. In this exemplary embodiment, fairing 20 is generally shaped to substantially mimic a mating perimeter shape of the lower control arm 30. It is also envisioned that the fairing 20 can be of a shape different that a mating member and also be attached to other vehicle underbody components to reduce aerodynamic drag without departing from the present invention. As best shown in FIG. 3, fairing 20 includes a generally convex shape 50 across a width of the fairing and the convex shape 50 generally spans a length of the fairing. In addition, the general convex shape 50 curves outward of an open end 60 of the suspension lower control arm 30 and contributes to improving aerodynamic efficiency of the air deflector arrangement 10.

Figure 3:
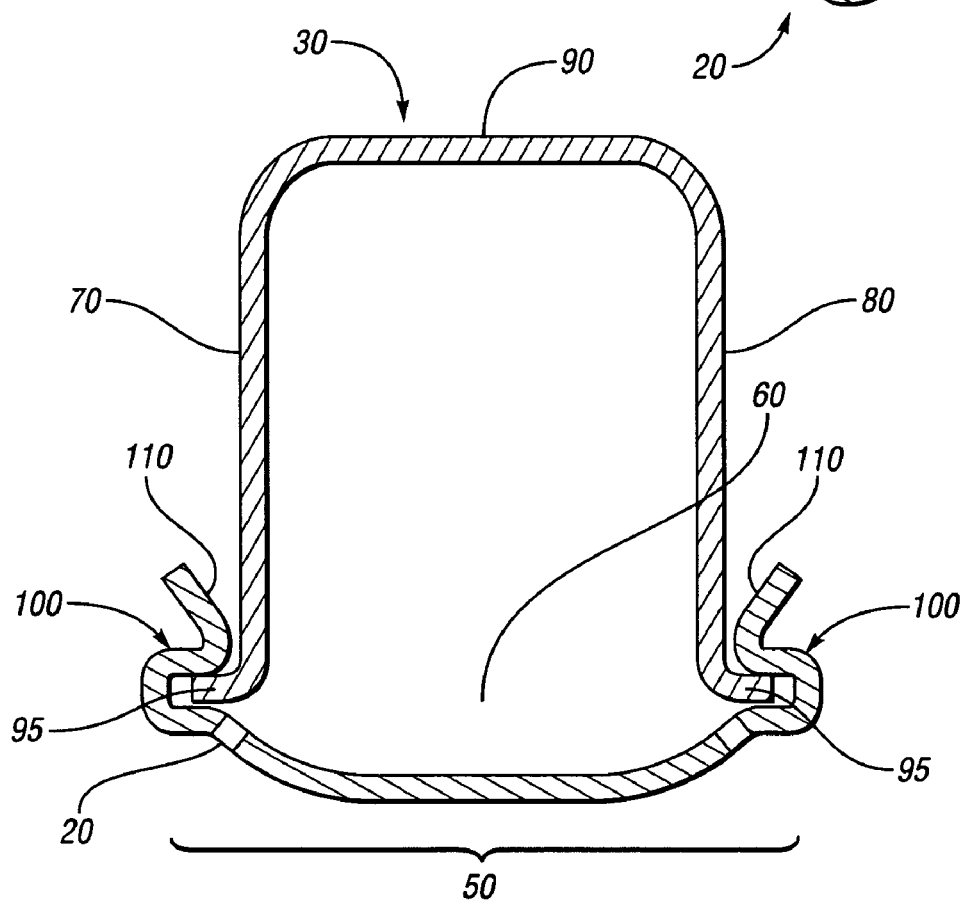
FIG. 3 illustrates a cross-sectional view of FIG. 2 along line A-A in accordance with the present invention.

Referring generally to FIG. 3, lower suspension control arm 30 has a general U-shape with the open end 60 of the U-shape facing downward. The general U-shape is formed by two leg members 70, 80 spaced apart by a connecting member 90. Lower suspension control arm 30 also includes flanges 95 positioned at each end of leg members 70, 80, respectively. Flanges 95 are generally perpendicular to their respective leg members 70, 80 are run a substantial length of suspension lower control arm 30.

Fairing 20 includes a plurality of integrated plastic clips 100 formed as a one piece unit with the fairing and arranged to snap over flanges 95 to affix fairing 20 to lower suspension control arm 30. In this exemplary embodiment, fairing 20 is a plastic component formed by plastic injection molding. It is also envisioned that fairing 20 can be constructed by other materials and/or use separately attached clips without departing from the present invention. Integrally formed plastic clips 100 include an angled surface 110 arranged to initially engage flanges 100 upon affixing fairing 20 to suspension control arm 30. Angled surface 110 in connection with clips 100 being flexible, provides an ability for clips 100 to slide and flex over flanges 100 or, put another way, snap over flanges 100 and hold fairing 20 against lower suspension control arm 30.

In operation, the air deflector arrangement of the present invention provides a more aerodynamic vehicle underbody by reducing aerodynamic drag. The air deflector arrangement includes the fairing that can be constructed of plastic thereby providing a relatively lightweight and inexpensive component for reducing aerodynamic drag. In addition, the fairing can be easily affixed to a lower suspension control arm using the integral snap clips and therefore not having to use any separate fasteners. The integral snap clips provide for simple and efficient assembly during a vehicle manufacturing process.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An air deflector for a vehicle underbody, the air deflector comprising:
  a fairing having a general convex shape including a smooth surface absent bumps, the fairing further having a plurality of integrally formed flexible clips extending from the smooth surface that engage an outturned flanged end extending outwardly from a downwardly extending sidewall of a generally U-shaped suspension system lower control arm having a pair of downwardly extending sidewalls snapping the integrally formed flexible clips over the outturned flanged ends such that the fairing substantially covers an open end of the generally U-shaped suspension system lower control arm, and the smooth surface extends over a width of the fairing and a length of the fairing, and the fairing reduces aerodynamic drag experienced during operation of the vehicle when attached to the generally U-shaped suspension system lower control arm.

2. The air deflector of claim 1, wherein the plurality of flexible clips are positioned on opposite ends of the width of the fairing.

3. The air deflector of claim 1, wherein the fairing further comprises a plastic fairing.

4. An air deflector arrangement for a vehicle underbody, the air deflector arrangement comprising:
  a vehicle underbody component that is a suspension control arm having a generally U-shape extending over a length of the component, the general U-shape including a pair of legs having flanged ends defining an open end that faces a direction opposite the vehicle underbody; and
  an aerodynamic drag reducing fairing having a smooth outer surface absent bumps, the fairing further having a plurality of flexible clips extending from the smooth surface and a plurality of angled surfaces in connection with the plurality of flexible clips, such that the angled surfaces engage the flanged ends of the suspension control arm for snapping the flexible clips over the flanged ends of the suspension control arm, and the fairing has a height less than the length of each leg of the suspension control arm and caps the open end reducing aerodynamic drag experienced during operation of the vehicle.

5. The air deflector arrangement of claim 4, wherein the flanges are arranged to protrude away from the open end and extending substantially along the length of the suspension control arm.

6. The air deflector arrangement of claim 5, wherein the plurality of flexible clips are positioned on opposite ends of a width of the fairing.

7. The air deflector arrangement of claim 5, wherein the fairing is arranged to be dimensioned so as to generally mimic a length and width of the suspension control arm.

8. The air deflector arrangement of claim 5, wherein the fairing comprises a width slightly larger than a width of the flanged open end of the suspension control arm, and a generally convex shape across the width of the fairing, the convex shape arrangement curving outward of the open end of the suspension control arm.

9. The air deflector arrangement of claim 4, wherein the fairing comprises a plastic fairing.

10. The air deflector arrangement of claim 4, wherein the suspension control arm comprises a multi-link rear suspension lower control arm.

11. An air deflector arrangement in combination with a vehicle underbody component of a vehicle comprising:
  an elongate vehicle suspension underbody component comprised of an elongate connecting member from which a pair of elongate sidewalls outwardly extend defining a generally U-shaped vehicle underbody component having an open channel with each sidewall of the vehicle suspension underbody component comprising a flange disposed at an angle relative to the sidewall; and
  an elongate aerodynamic drag-reducing fairing of one-piece and unitary construction comprised of a generally convex body that covers the open channel of the vehicle suspension underbody component with the generally convex body of the fairing comprising a plurality of integrally formed clips configured for snap-fit engagement with each sidewall of the vehicle suspension underbody component and the convex body of the fairing having a pair of side edges that each abut a corresponding one of the vehicle suspension underbody component sidewalls and wherein the integrally formed snap-fit engagement clips attach the fairing to the vehicle suspension underbody component without requiring any separate fasteners.

12. The combination of claim 11 wherein each integrally formed clip comprises an integrally formed flange-receiving channel in which a corresponding one of the flanges of the vehicle suspension underbody component is received and an integrally formed clip flange that engages with the corresponding one of the flanges of the vehicle suspension underbody component during fairing attachment guiding the corresponding one of the flanges of the vehicle suspension underbody component into the flange-receiving channel of the clip.

13. The combination of claim 12 wherein each flange of each sidewall of the vehicle suspension underbody component is outturned from a corresponding one of sidewalls from which the flange extends.

14. The combination of claim 11 wherein the fairing is comprised of plastic, has a substantially smooth outer surface that faces away from the vehicle underbody to which the fairing is attached, and has a height less than the length of either sidewall of the vehicle suspension underbody component.

15. The combination of claim 11 wherein the vehicle suspension underbody component comprises a suspension control arm.

16. The combination of claim 15 wherein the suspension control arm is of one-piece and unitary construction.

* * * * *